(12) United States Patent
Tan (10) Patent No.: US 11,199,910 B2
(45) Date of Patent: Dec. 14, 2021

(54) OPTICAL NAVIGATION DEVICE, OPTICAL NAVIGATION METHOD AND IMAGE PROCESSING SYSTEM (71) Applicant: PixArt Imaging Inc., Hsin-Chu (TW)

(72) Inventor: Shan Chong Tan, Penang (MY)

(73) Assignee: PixArt Imaging Inc., Hsin-Chu (TW)

(*) Notice: Subject to any disclaimer, the term of this patent is extended or adjusted under 35 U.S.C. 154(b) by 109 days.

(21) Appl. No.: 16/435,566

(22) Filed: Jun. 10, 2019

(65) Prior Publication Data
US 2020/0387233 A1 Dec. 10, 2020

(51) Int. Cl.
G06K 9/00 (2006.01)
G06F 3/03 (2006.01)
G06K 9/62 (2006.01)

(52) U.S. Cl.
CPC .............. *G06F 3/03* (2013.01); *G06K 9/6203* (2013.01); *G06F 2200/1637* (2013.01)

(58) Field of Classification Search
None
See application file for complete search history.

(56) References Cited

U.S. PATENT DOCUMENTS

2007/0252814 A1* 11/2007 Lin ................... G06F 3/0317 345/158
2011/0141022 A1* 6/2011 Gordon ............. G06F 3/0317 345/166
2017/0034465 A1* 2/2017 Hsu ....................... H04N 5/378

* cited by examiner

Primary Examiner — Wei Wen Yang
(74) Attorney, Agent, or Firm — Winston Hsu (57) ABSTRACT An optical navigation device comprising: a first reading circuit; a second reading circuit; a first image sensing region, coupled to the first reading circuit; a second image sensing region, coupled to the second reading circuit; and a control circuit, coupled to the first reading circuit and the second reading circuit; wherein the first image sensing region captures a first image at a first time and the second image sensing region captures a second image at a second time after the first time; wherein the control circuit calculates a motion of the optical navigation device according to a relative displacement between the first image and the second image.

10 Claims, 9 Drawing Sheets

OPTICAL NAVIGATION DEVICE, OPTICAL NAVIGATION METHOD AND IMAGE PROCESSING SYSTEM

BACKGROUND OF THE INVENTION

1. Field of the Invention

The present invention relates to an optical navigation device, an optical navigation method and an image processing system, and particularly relates to an optical navigation device, an optical navigation method and an image processing system which can use multi image sensing regions.

2. Description of the Prior Art

Figure 1:
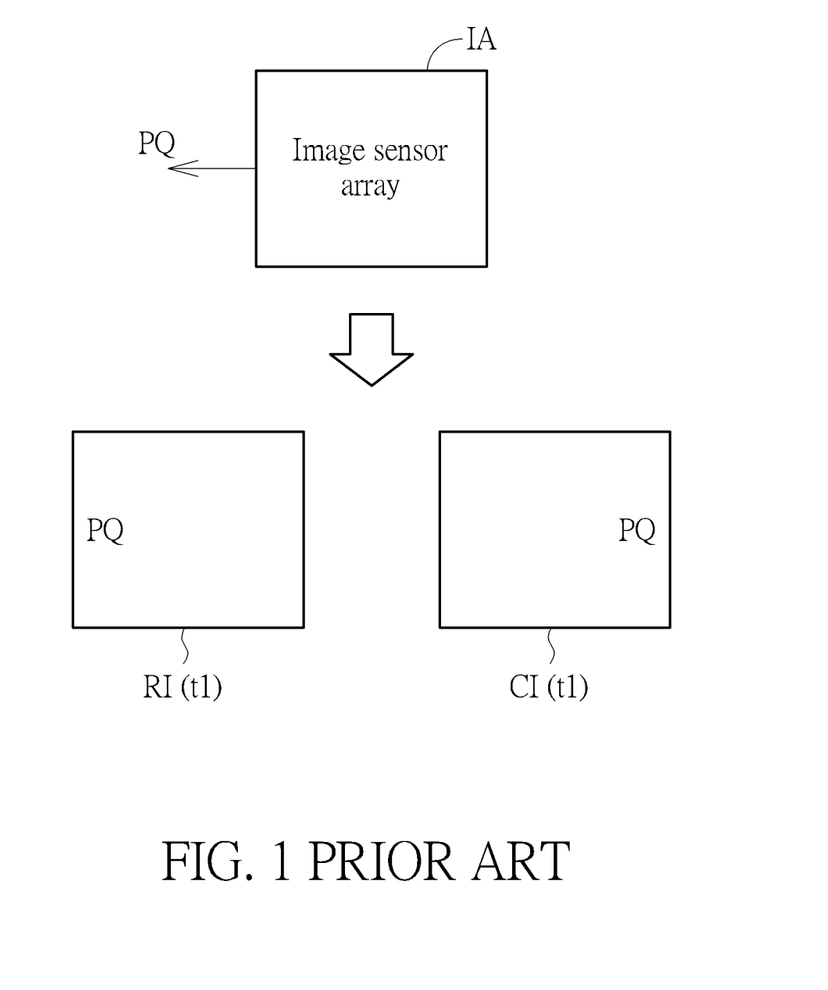
FIG. 1 is a block diagram illustrating operations of a conventional optical navigation device.

FIG. 1 is a schematic diagram illustrating operations of a conventional optical navigation device. As illustrated in FIG. 1, the image sensor array IA used in an optical navigation device, such as an optical mouse, works based on sampling continuous frames of image at high frequency and employs a technique called correlation to derive the relative displacement between the reference image RI and the compare image CI.

The limitation of this technique lies in the amount of feature overlapped between the two images. Take FIG. 1 for example, the optical navigation device comprising the image sensor array IA moves to the left, thus the image sensor array IA moves to the left as well. If the feature PQ locates on the path of the image sensor array IA, the image sensor array IA may first captures the reference image RI comprising the image of feature PQ at the first time t1, and then captures the compare image CI also comprising the image of feature PQ at the second time t2. If the overlap region of the reference image RI and the compare image CI is large enough, the compare image CI also comprises the image of feature PQ. In such case, the image of feature PQ in the reference image RI can be regarded as moving to the right while in the compare image CI, since the optical navigation device moves to the left.

However, as the velocity of the optical navigation device increases, the overlapped region in the two subsequent images would gradually decreases. Therefore, the compare image CI may not comprise the image of feature PQ or comprises only a small part of it, if the velocity of the optical navigation device is too fast. In such case, the relative displacement between the reference image RI and the compare image CI is hard to be calculated or could not be calculated.

One of the solutions to overcome this issue is to increase the image sampling rate of the image sensor array to reduce the relative displacement between two subsequent frames. But this fast sampling technique will eventually hit a bottleneck due to the finite amount of time required for image acquisition, transfer, analog to Digital conversion and navigation algorithm processing.

SUMMARY OF THE INVENTION

One objective of the present invention is to provide an optical navigation device and an optical navigation method which can calculates a motion thereof via multi image sensing regions.

Another objective of the present invention is to provide an image sensing system which can sense images via multi image sensing regions.

One embodiment of the present invention discloses an optical navigation device, which comprises: a first reading circuit; a second reading circuit; a first image sensing region, coupled to the first reading circuit; a second image sensing region, coupled to the second reading circuit; and a control circuit, coupled to the first reading circuit and the second reading circuit; wherein the first image sensing region captures a first image at a first time and the second image sensing region captures a second image at a second time after the first time; wherein the control circuit calculates a motion of the optical navigation device according to a relative displacement between the first image and the second image.

Another embodiment of the present invention discloses an image sensing system comprising: a first reading circuit; a second reading circuit; a first image sensing region, coupled to the first reading circuit; a second image sensing region, coupled to the second reading circuit; and a control circuit, coupled to the first reading circuit and the second reading circuit; wherein the first image sensing region captures a first image at a first time and the second image sensing region captures a second image at a second time after the first time.

Still another embodiment of the present invention discloses: a non-transitory computer readable recording media with at least one program recorded therein, an optical navigation method applied to an optical navigation device comprising a first image sensing region and a second sensing region can be performed when the program is executed, the optical navigation method comprising: capturing a first image at a first time by the first image sensing region; capturing a second image at a second time after the first time; and calculating a motion of the optical navigation device according to a relative displacement between the first image and the second image.

In view of above-mentioned embodiments, multi imager sensing regions can be applied to calculate the motion of the optical navigation device. Accordingly, the issue of motion calculation when the optical navigation device has a high velocity can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note the components depicted in following embodiments can be implemented by hardware or by firmware. Besides, the terms "first", "second" in each embodiment are only for defining different steps or components, but do not mean the sequence thereof. Besides, the following methods can be performed via executing at least one program recorded in a non-transitory computer readable recording medium, such as a memory device, a hard disc or an optical disc.

Figure 2:
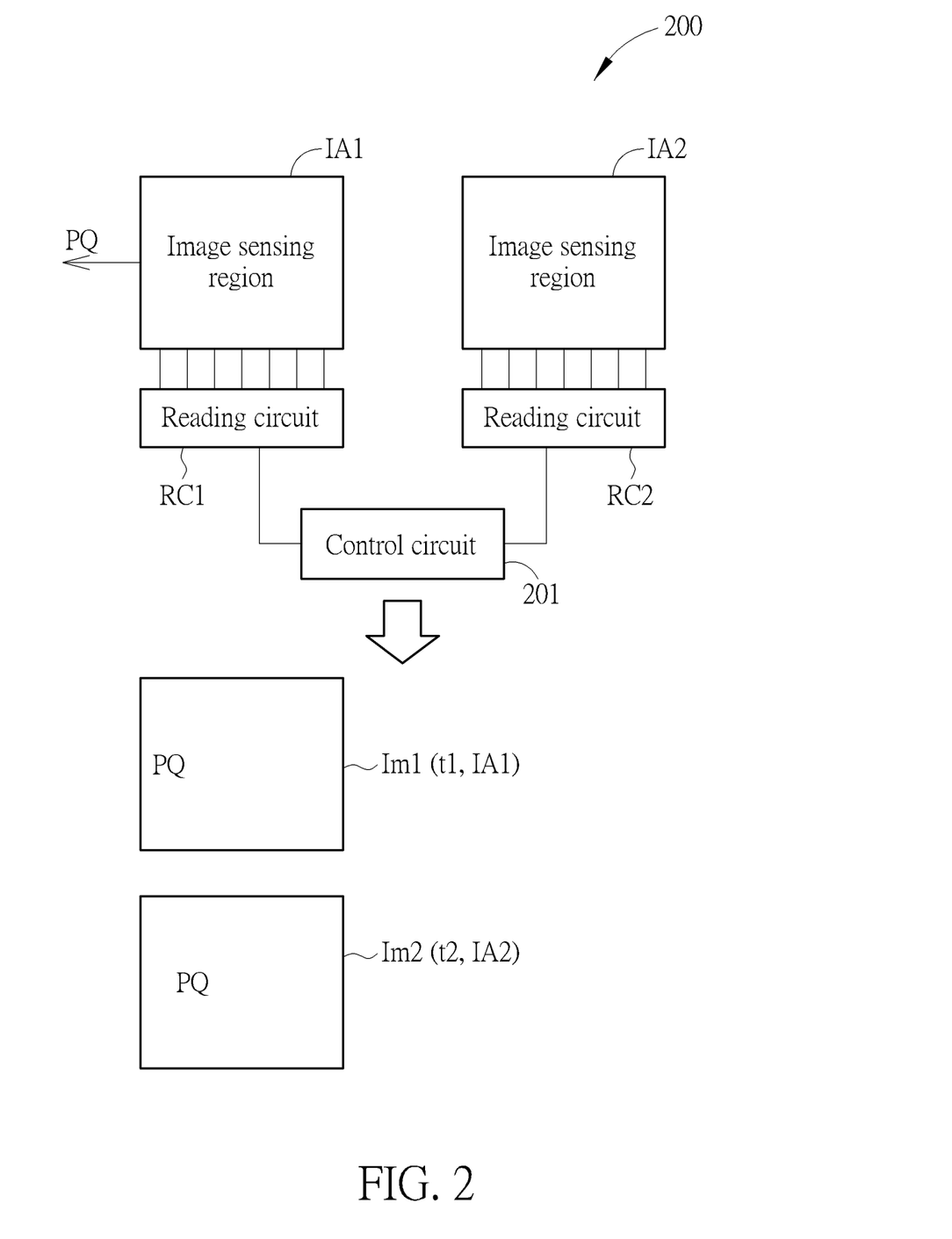
FIG. 2 and FIG. 3 are block diagrams illustrating optical navigation devices according to different embodiments of the present invention.

FIG. 2 is a block diagram illustrating an optical navigation device according to one embodiment of the present invention. As illustrated in FIG. 2, the optical navigation device 200 comprises a control circuit 201, a first reading circuit RC1, a second reading circuit RC2, a first image sensing region IA1, and a second image sensing region IA2. The first image sensing region IA1 and the second image sensing region IA2 can be provided in a single image sensing array and can be provided in two independent image sensor arrays.

The control circuit 201 is configured to control operations of the first reading circuit RC1, the second reading circuit RC2, the first image sensing region IA1, and the second image sensing region IA2. The first reading circuit RC1 is configured to read the image sensing data (e.g. image sensing charges) of the first image sensing region IA1, and the second reading circuit RC2 is configured to read the image sensing data of the second image sensing region IA2. The first reading circuit RC1 and the second reading circuit RC2 can comprise, for example, analog to digital converters for transforming analog image sensing data to digital image sensing data, and amplifiers for amplifying the image sensing data. In one embodiment, the first reading circuit RC1 and the second reading circuit RC2 can be integrated to a single reading circuit.

The first image sensing region IA1 captures a first image Im1 at a first time t1 and the second image sensing region IA2 captures a second image Im2 at a second time t1 after the first time t1. The control circuit 201 calculates a motion of the optical navigation device 200 according to a relative displacement between the first image Im1 and the second image Im2.

For more detail, in the embodiment of FIG. 2, the optical navigation device 200 moves toward the left, and the feature PQ is on the path that the optical navigation device 200 moves on. Therefore, the first sensing region IA1 first captures the first image Im1 at the first time t1, and then the second sensing region IA2 captures the second image Im2 at second time t2. In the example of FIG. 2, after the first sensing region IA1 captures the first image Im1, the second image sensing region IA2 moves to a location close to the feature PQ, thus can still capture the image of the feature PQ even if the optical navigation device 200 has a high velocity. After that, the control circuit 201 can use the first image Im1 as a reference image and uses the second frame Im2 as a compare image, to calculate a motion of the optical navigation device 200 according to a relative displacement between the first image Im1 and the second image Im2. Please note, the feature PQ is only an example for explaining the operation of the optical navigation device 200, the relative displacement between the first image Im1 and the second image Im2 can be calculated by a plurality features thereof.

The operations of the first image sensing region IA1 and the second image sensing region IA2 can be changed based on the moving direction of the optical navigation device 200. In other words, the functions (capture the reference image or capture the compare image) of the first image sensing region IA1 and the second image sensing region IA2 can be swapped based on the moving direction of the optical navigation device 200.

Figure 3:
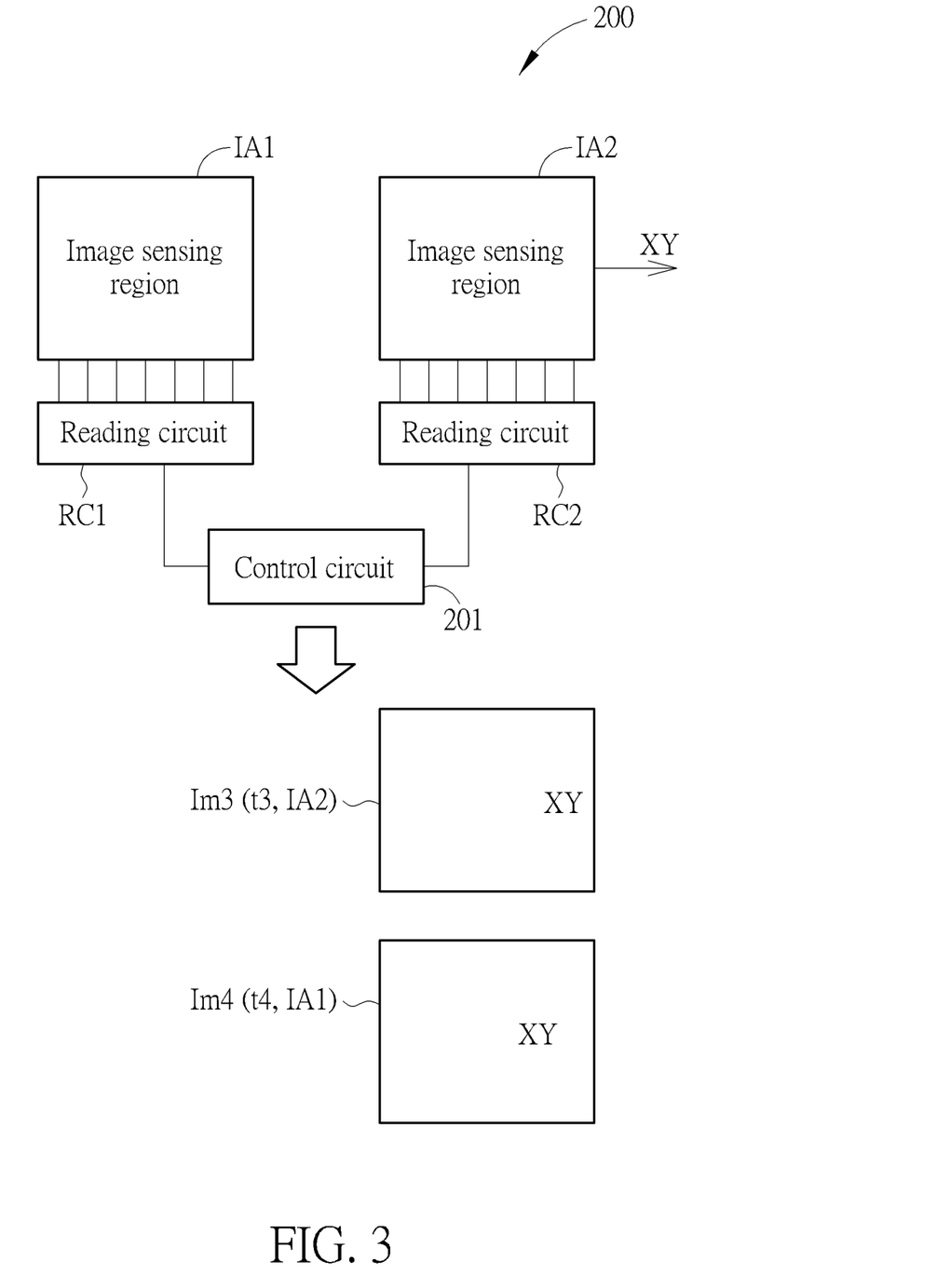

In the embodiment of FIG. 3, the optical navigation device 200 moves toward the right, and the feature XY is on the path that the optical navigation device 200 moves on. Therefore, the second sensing region IA1 first captures the third image Im3 at third time t3 after the second time t2, and then the first sensing region IA1 captures the fourth image Im4 at the fourth time t4. In the example of FIG. 3, after the second sensing region IA2 captures the third image Im3, the first image sensing region IA1 moves to a location close to the feature XY, thus can still capture the image of the feature XY even if the optical navigation device 200 has a high speed. After that, the control circuit 201 can use the third frame Im3 as a reference image and uses the fourth frame Im4 as a compare image, to calculate a motion of the optical navigation device 200 according to a relative displacement between the third image Im3 and the fourth image Im4.

Many methods can be applied to determine the moving direction of the optical navigation device 200. Take FIG. 2 for example, the moving direction can be determined according to images captured by only one of the first image sensing region IA1 and the second image sensing region IA2, or according to images captured by both the first image sensing region IA1 and the second image sensing region IA2.

In one embodiment, the relative displacement calculated according to the first image Im1 and the second image Im2 in FIG. 2 can be further calibrated according to a ratio between t2-t1 and a sum of time for reading the first image Im1, time for reading the second image Im2, and time for calculating motion according to the first image Im1 and the second image Im2.

Figure 4:
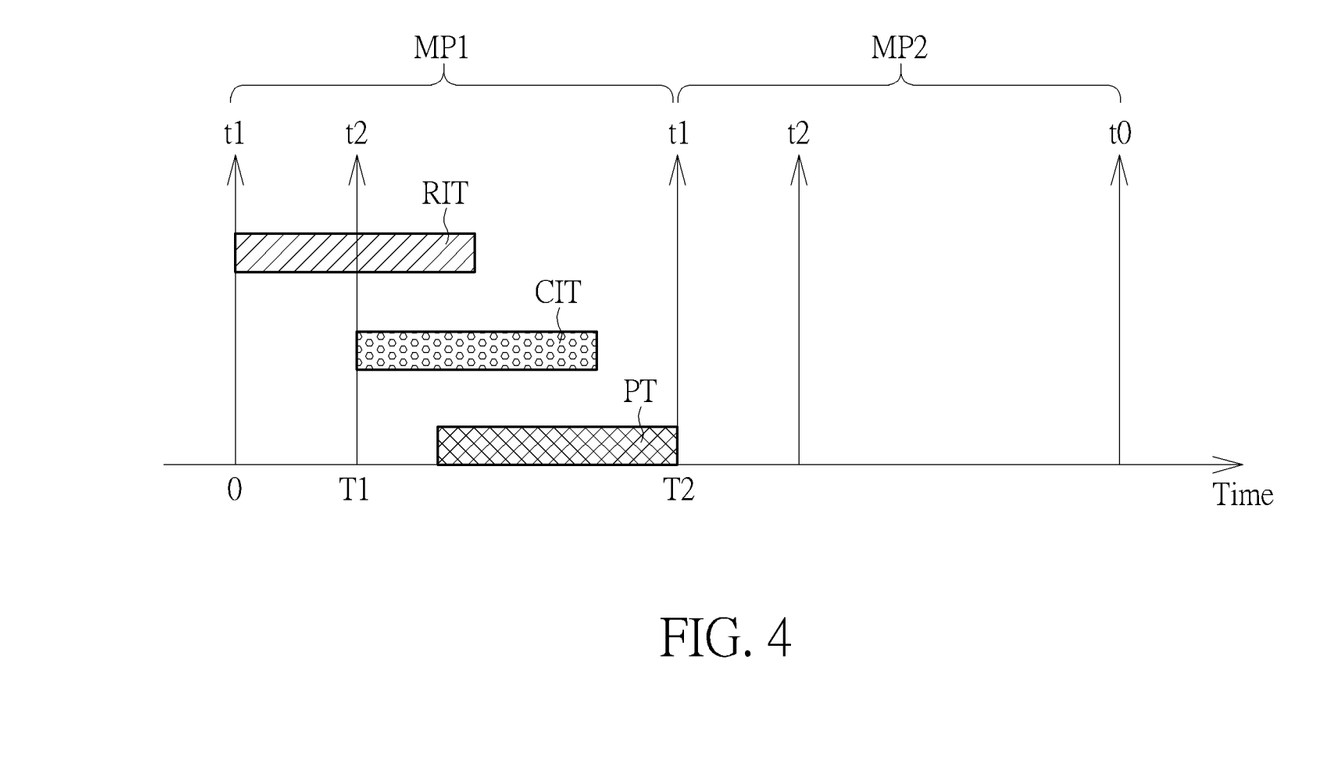
FIG. 4-FIG. 6 are schematic diagrams illustrating operations of the optical navigation device disclosed in FIG. 2.

As illustrated in FIG. 4, MP1, MP2 respectively indicate a multi-image period, in which necessary images are captured and relative displacement are calculated based on necessary images. Take the embodiment in FIG. 2 for example, t1 is the first time t1 at which the first image Im1 is captured and the time period RIT means the time for reading image sensing data of the first image Im1 from the first image sensing region Im1 and for transforming analog image sensing data to digital image sensing data. Also, t2 is the second time t2 at which the second image Im2 is captured and the time period CIT means the time for reading image sensing data of the second image Im2 from the second image sensing region Im2 and for transforming analog image sensing data to digital image sensing data. Additionally, the time period PT indicates the time needed for calculating the relative displacement between the first image Im1 and the second image Im2, and needed for calculating the motion according to the displacement.

However, in such case, only the relative displacement for the time interval t1-t2 (i.e. T1) is calculated but the relative displacement for the time interval t2-next t1 (i.e. T2-T1) is not calculated. Accordingly, in one embodiment the relative displacement for the time interval t0-t1 is calibrated by multiplying T2/T1. T1 can mean t2-t1 and T2 means a sum of time for reading the first image Im1, time for reading the second image Im2, and time for calculating motion according to the first image Im1 and the second image Im2.

Figure 5:
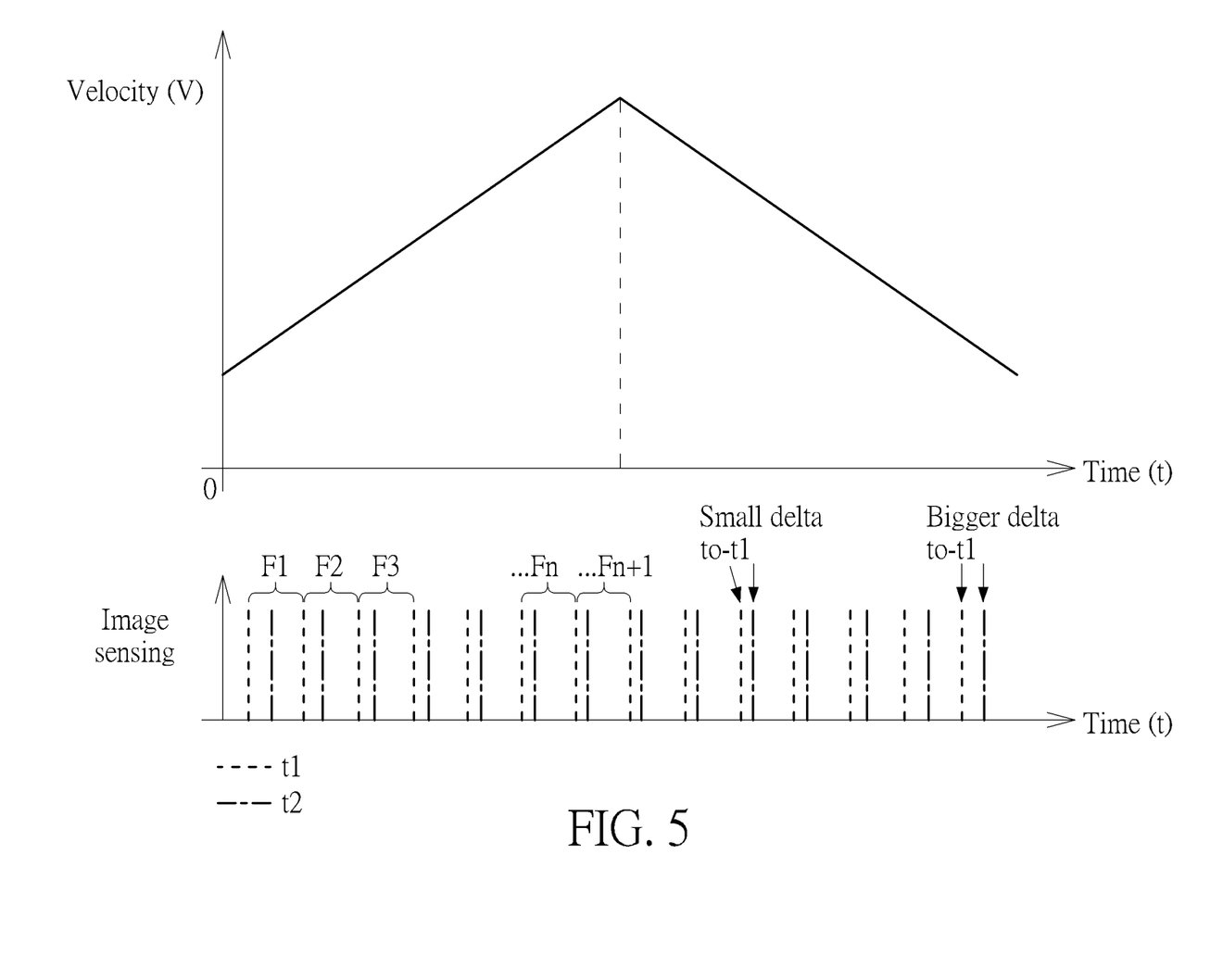

In the embodiment FIG. 2, the control circuit 210 can calculate a velocity of the optical navigation device 200 according to the calculated motion and adjusts a delta between the first time t1 and the second time t2 corresponding to the velocity. In FIG. 5, F1, F2, F3, F4 . . . respectively means a group of a first image Im1 and a second image Im2. As illustrated in FIG. 5, the higher the velocity of the optical navigation device 200, the larger the delta between the first time t1 and the second time t2 is. On the opposite, the lower the velocity of the optical navigation device 200, the smaller the delta between the first time t1 and the second time t2 is. By such method, the overlapped region between the first image Im1 and the second image Im2 can be ensured large enough without consuming too much power for increasing the frame rate.

In one embodiment, the optical navigation device 200 can operate in a single sensing mode to calculate the motion thereof according to images captured by a single image sensing region, like a conventional optical navigation device 200. Also, the optical navigation device 200 can operate in a multi-sensing mode to calculate the motion thereof according to images captured by more than one image sensing regions, such as the embodiments illustrated in FIG. 2 and FIG. 3. Further, the control circuit 201 can selectively switch between the single sensing mode and the multi-sensing mode based on the velocity of the optical navigation device 200.

Figure 6:
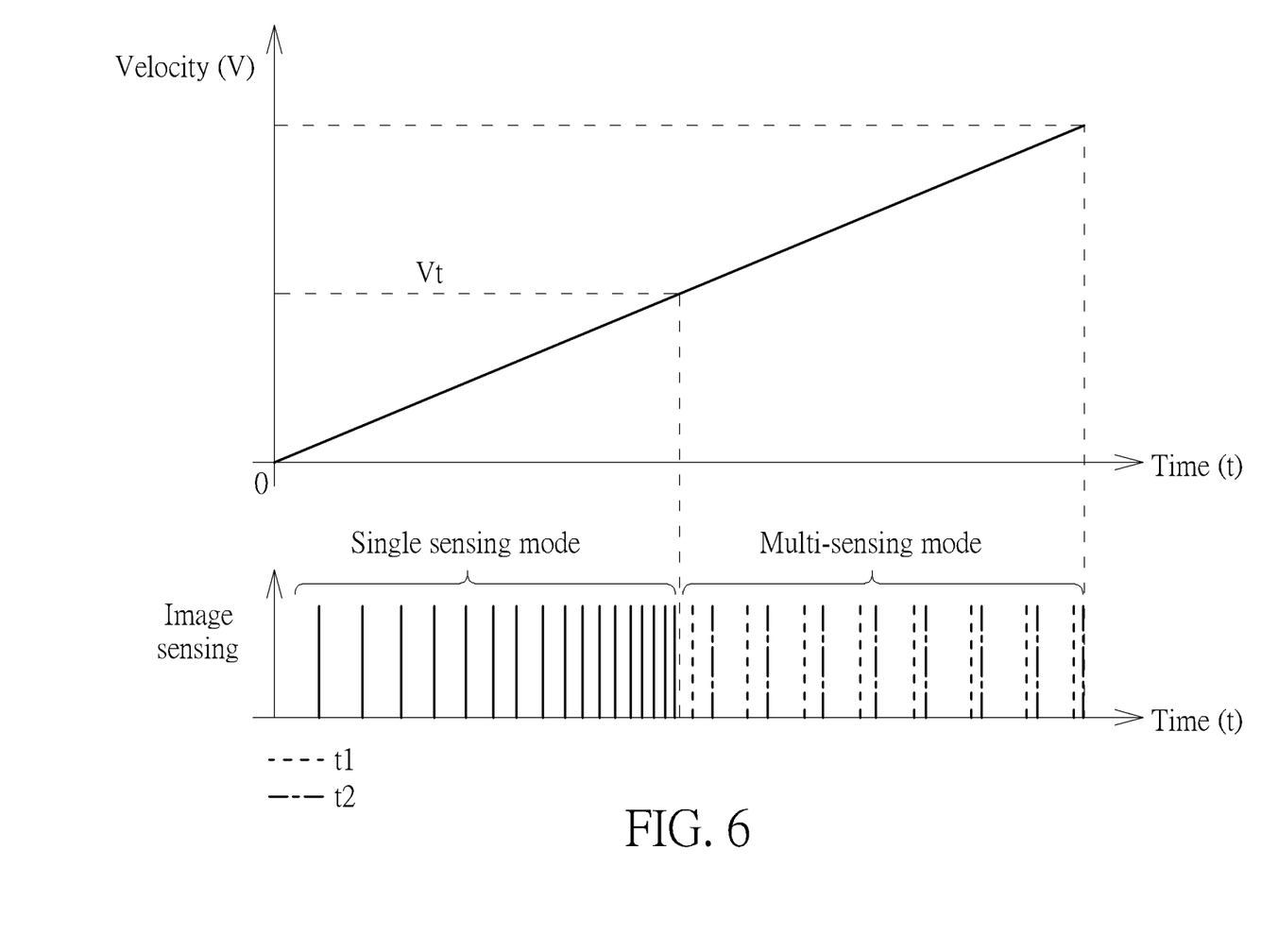

As illustrated in FIG. 6, the control circuit 201 calculates a velocity of the optical navigation device according to the calculated relative displacement. After that, only one of the first image sensing region IA1 and the second image sensing region IA2 is activated to capture an image when the velocity is lower than a velocity threshold Vt (single sensing mode). Also, the first image sensing region IA1 is activated to capture the first image Im1 and the second image sensing region IA2 is activated to capture the second image Im2 when the velocity is higher than the velocity threshold Vt (multi-sensing mode).

Figure 7:
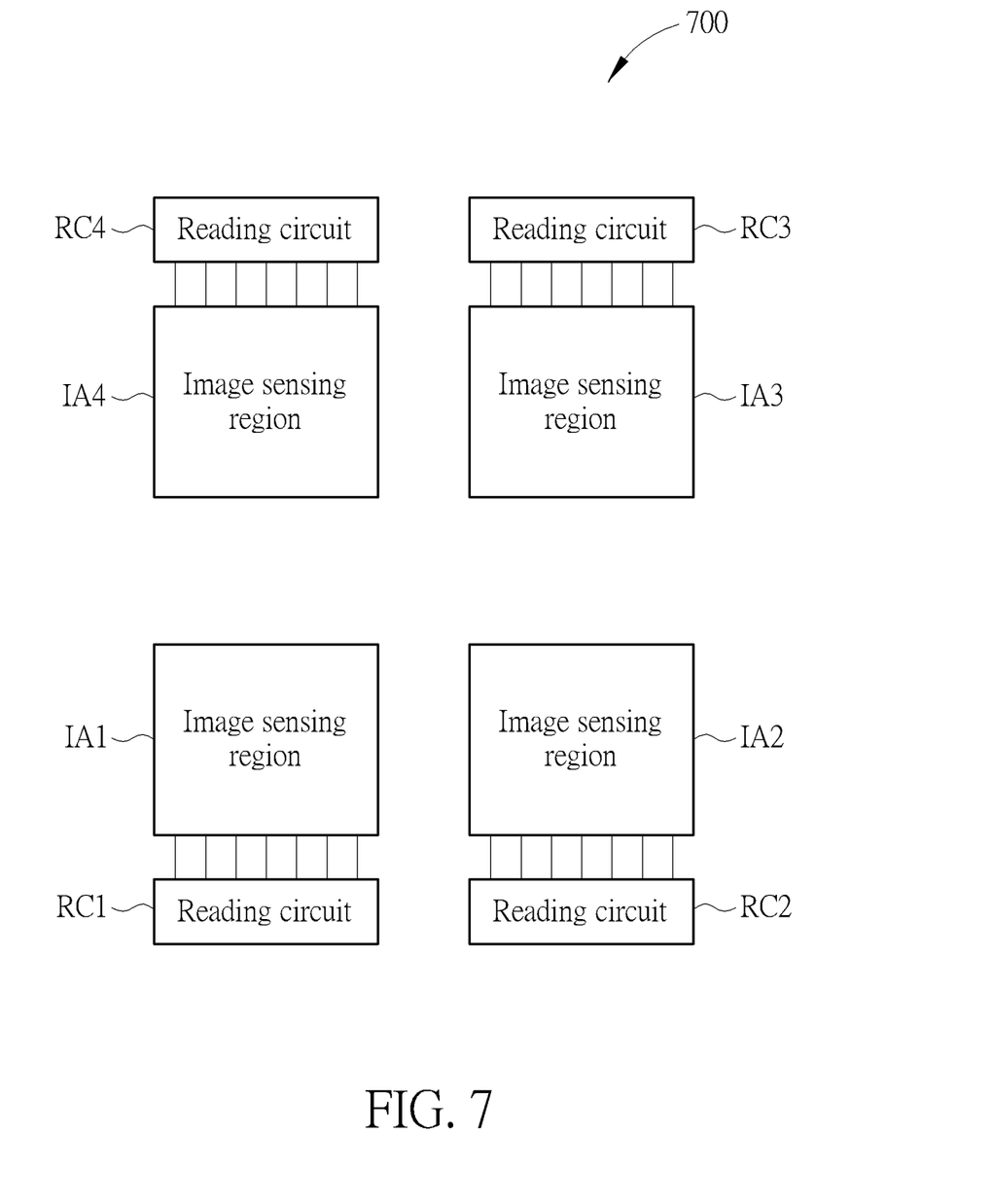
FIG. 7-FIG. 8 are block diagrams illustrating an optical navigation devices according to different embodiments of the present invention.

The optical navigation device provided by the present invention can comprise more than two image sensing regions. FIG. 7 is a block diagram illustrating an optical navigation device according to one embodiment of the present invention. As illustrated in FIG. 7, the optical navigation device 700 further comprises a third image sensing region IA3 and a fourth image sensing region IA4 besides the first image sensing region IA1 and the second image sensing region IA2. Besides, the optical navigation device 700 further comprises a third reading circuit RC3 coupled to the third image sensing region IA3, and a fourth reading circuit RC4 coupled to the fourth image sensing region IA4. The first reading circuit RC1, the second reading circuit RC2, the third reading circuit RC3 and the fourth reading circuit RC4 can be integrated to a single reading circuit. Please note the control circuit is not illustrated here for clarity.

In the embodiment of FIG. 7, the control circuit calculates the moving direction of the optical navigation device 700 and accordingly selects which image sensing regions should be used to calculate the motion thereof. For example, the control circuit determines whether a moving direction of the optical navigation device 700 is from the second image sensing region IA2 to the first sensing region IA1 or from the third image sensing region IA3 to the first sensing region IA1. After that, the second image sensing region IA2 captures the second image Im2 at the second time t2 after the first image sensing region IA1 captures the first image Im1 at the first time t1, when the moving direction is from the second image sensing region IA2 to the first sensing region IA1. Similarly, the third image sensing region IA3 captures an image for relative displacement calculating after the first image sensing region IA1 captures the first image Im1 at the first time t0, when the moving direction is from the third image sensing region IA3 to the first sensing region IA1.

Many methods can be applied to determine the moving direction of the optical navigation device 700. Take FIG. 7 for example, the moving direction can be determined according to images captured by only one of the first image sensing region IA1, the second image sensing region IA2, the third image sensing region IA3, and the fourth image sensing region IA4, or according to images captured by any two of the first image sensing region IA1, the second image sensing region IA2, the third image sensing region IA3, and the fourth image sensing region IA4.

Figure 8:
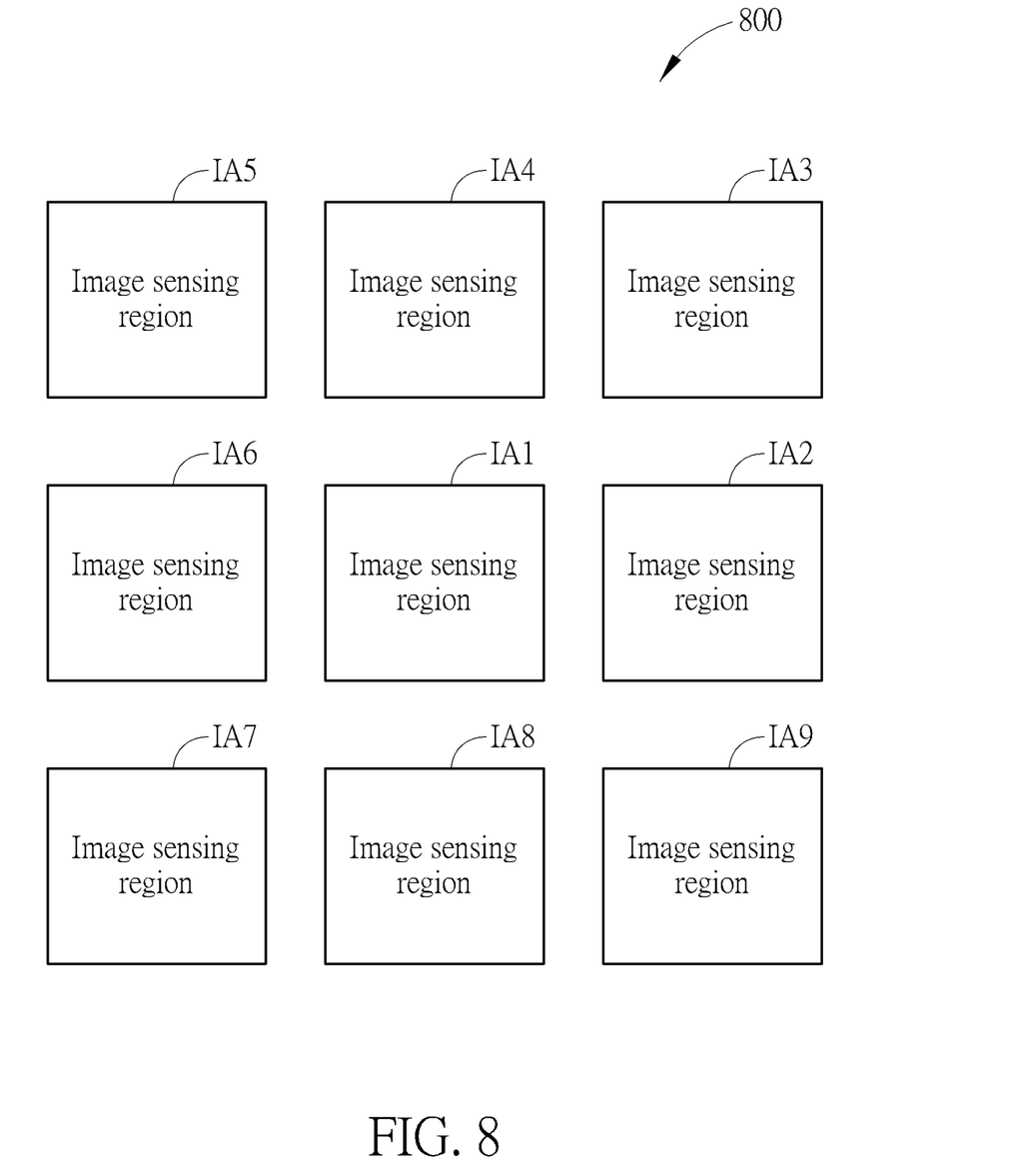

The method illustrated in FIG. 7 can be applied to an optical navigation device comprises another number of image sensing regions. As illustrated in FIG. 8, the optical navigation device 800 comprises nine image sensing regions IA1-IA9. The method illustrated in FIG. 7 can be applied to the optical navigation device 800, that is, the image sensing regions applied to calculate the motion of the optical navigation device can be selected based on the moving direction of the optical navigation device 800. Besides, the methods depicted in FIG. 2 and FIG. 3 can also be applied to the optical navigation device 800, that is, the function of the image sensing regions can be swapped based on the moving direction of the optical navigation device 800.

Please note, the above-mentioned contents can be applied to any image sensing system rather that limited to the optical navigation device. For example, the first image Im1 and the second image Im2 are captured following the embodiment illustrated in FIG. 2, but the first image Im1 and the second image Im2 can be applied for other following processing rather than for calculating the motion of the optical navigation device.

Figure 9:
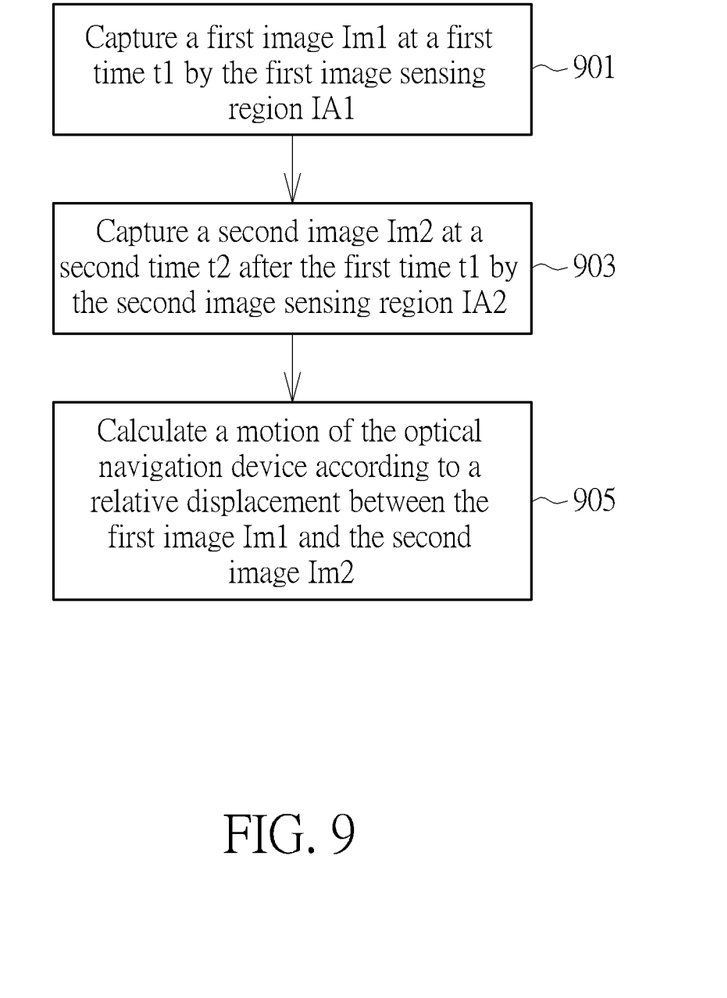
FIG. 9 is a flow chart illustrating an optical navigation method according to one embodiment of the present invention.

In view of above-mentioned embodiments, an optical navigation method can be acquired, which can be performed via executing at least one program recorded in a non-transitory computer readable recording media. The optical navigation method comprises:

Step 901

Capture a first image Im1 at a first time t1 by the first image sensing region IA1.

Step 903

Capture a second image Im2 at a second time t2 after the first time t1.

Step 905

Calculate a motion of the optical navigation device according to a relative displacement between the first image Im1 and the second image Im2.

In view of above-mentioned embodiments, multi imager sensing regions can be applied to calculate the motion of the optical navigation device. Accordingly, the issue of motion calculation when the optical navigation device has a high velocity can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical mouse, comprising:
a first reading circuit;
a second reading circuit;
a first image sensing region, coupled to the first reading circuit;
a second image sensing region, coupled to the second reading circuit, wherein the first image sensing region and the second image sensing region are provided in two independent image sensor arrays; and
a control circuit, coupled to the first reading circuit and the second reading circuit;

wherein when a moving direction of the optical mouse is from the second image sensing region to the first image sensing region, the first image sensing region captures a first image at a first time and the second image sensing region captures a second image at a second time after the first time, and the control circuit uses the first image as a reference image and uses the second frame as a compare image, to calculate a motion of the optical mouse according to a relative displacement between the first image and the second image;

wherein when the moving direction of the optical mouse is from the first image sensing region to the second image sensing region, the second image sensing region captures a third image at a third time and the first image sensing region captures a fourth image at a fourth time after the third time, and the control circuit uses the third image as the reference image and uses the fourth image as the compare image, to calculate the motion of the optical mouse according to a relative displacement between the third image and the fourth image.

2. The optical optical mouse of claim 1, wherein the control circuit further calibrates the relative displacement according to a ratio between a difference of the first time and the second time, and a sum of time for reading the first image, time for reading the second image, and time for calculating motion according to the first image and the second image.

3. The optical mouse of claim 1, wherein the control circuit calculates a velocity of the optical mouse according to the relative displacement and adjusts a delta between the first time and the second time corresponding to the velocity.

4. The optical mouse of claim 1,
wherein the control circuit calculates a velocity of the optical mouse according to the relative displacement;
wherein only one of the first image sensing region and the second image sensing region is activated to capture an image when the velocity is lower than a velocity threshold;
wherein the first image sensing region is activated to capture the first image and the second image sensing region is activated to capture the second image when the velocity is higher than the velocity threshold.

5. The optical mouse of claim 1, further comprising:
a third reading circuit, coupled to the control circuit;
a third image sensing region, coupled to the third reading circuit;
wherein the control circuit determines whether a moving direction of the optical mouse is from the second image sensing region to the first sensing region or from the third image sensing region to the first sensing region;
wherein the second image sensing region captures the second image at the second time when the moving direction is from the second image sensing region to the first sensing region.

6. A non-transitory computer readable recording media with at least one program recorded therein, an optical navigation method applied to an optical mouse comprising a first image sensing region and a second sensing region can be performed when the program is executed, wherein the first image sensing region and the second image sensing region are provided in two independent image sensor arrays, the optical navigation method comprising:

when a moving direction of the optical mouse is from the second image sensing region to the first image sensing region, using the first image sensing region to capture a first image at a first time and using the second image sensing region to capture a second image at a second time after the first time, and using the first image as a reference image and uses the second frame as a compare image, to calculate a motion of the optical mouse according to a relative displacement between the first image and the second image;

when the moving direction of the optical mouse is from the first image sensing region to the second image sensing region, using the second image sensing region to capture a third image at a third time and using the first image sensing region captures a fourth image at a fourth time after the third time, and using the third image as the reference image and using the fourth image as the compare image, to calculate the motion of the optical mouse according to a relative displacement between the third image and the fourth image.

7. The non-transitory computer readable recording media of claim 6, further comprising:
calibrating the relative displacement according to a ratio between a difference of the first time and the second time, and a sum of time for reading the first image, time for reading the second image, and time for calculating motion according to the first image and the second image.

8. The non-transitory computer readable recording media of claim 6, wherein the optical navigation method further comprises:
calculating a velocity of the optical mouse according to the relative displacement; and
adjusting a delta between the first time and the second time corresponding to the velocity.

9. The non-transitory computer readable recording media of claim 6, wherein the optical navigation method further comprises:
calculating a velocity of the optical mouse according to the relative displacement;
activating only one of the first image sensing region and the second image sensing region to capture an image when the velocity is lower than a velocity threshold; and
activating the first image sensing region to capture the first image and activating the second image sensing region to capture the second image when the velocity is higher than the velocity threshold.

10. The non-transitory computer readable recording media of claim 6, wherein the optical mouse further comprises a third image sensing region, wherein the optical navigation method further comprises:
determining whether a moving direction of the optical mouse is from the second image sensing region to the first sensing region or from the third image sensing region to the first sensing region;
captures the second image at the second time by the second image sensing region if the moving direction is from the second image sensing region to the first sensing region.

* * * * *